United States Patent [19]

Hesketh et al.

[11] Patent Number: 5,315,624
[45] Date of Patent: May 24, 1994

[54] PRODUCTION OF NUCLEAR FUEL

[75] Inventors: Kevin W. Hesketh, Preston; Brian C. Hexter, Fylde, both of United Kingdom

[73] Assignee: British Nuclear Fuels PLC, Cheshire, England

[21] Appl. No.: 16,545

[22] Filed: Feb. 11, 1993

[30] Foreign Application Priority Data

Feb. 13, 1992 [GB] United Kingdom .............. 9203090.7

[51] Int. Cl.$^5$ .............................................. G21C 21/00
[52] U.S. Cl. .................................... 376/261; 376/421; 376/901; 264/0.5
[58] Field of Search ............... 376/261, 421, 409, 901; 264/0.5

[56] References Cited

U.S. PATENT DOCUMENTS

| | | | |
|---|---|---|---|
| 4,247,495 | 1/1981 | Ennerst et al. | 376/901 |
| 4,261,934 | 4/1981 | Hart et al. | 376/421 |
| 5,089,210 | 2/1992 | Reese et al. | 376/419 |

Primary Examiner—Daniel D. Wasil
Attorney, Agent, or Firm—Nixon & Vanderhye

[57] ABSTRACT

A process for the production of plutonium-containing mixed oxide nuclear fuel. The process comprises selecting a plutonium-containing solution, determining the plutonium isotopic composition of the solution, precipitating particulate plutonium oxide from the solution, forming a mixture comprising the plutonium oxide and a particulate uranium oxide, and forming nuclear fuel compacts from the mixture. The amount of plutonium in the mixture is controlled in accordance with a given equation.

4 Claims, No Drawings

PRODUCTION OF NUCLEAR FUEL

BACKGROUND OF THE INVENTION

This invention related to the production of nuclear fuel, and more particularly to the production of plutonium-containing mixed oxide nuclear fuel (hereinafter referred to as "MOX fuel"), such as mixed plutonium oxide and uranium oxide nuclear fuel.

The reactivity of MOX fuel assemblies over their lifetime in a nuclear reactor can be affected by plutonium isotopic variations if no special measures are taken to counter the effect of the variations. Plutonium isotopic variations can also cause local hot spots in MOX fuel assemblies which can increase within-assembly peaking factors should the highest rated fuel rod contain plutonium with a higher than specified fissile plutonium fraction. To alleviate these problems the current practice by MOX fuel manufacturers is either to homogenise all the $Pu(NO_3)_4$ required for an entire reactor reload of MOX fuel assemblies or, alternatively, to use a 'mix and match' approach of blending $Pu(NO_3)_4$ from various separate batches in order to meet the specified plutonium isotopic composition.

SUMMARY OF THE INVENTION

According to the present invention there is provided a process for the production of plutonium-containing mixed oxide nuclear fuel, the process comprising selecting a plutonium-containing solution, determining the plutonium isotopic composition of the solution, precipitating particulate plutonium oxide from the solution, forming a mixture comprising the plutonium oxide and a particulate uranium oxide, and forming nuclear fuel compacts from the mixture, the amount of plutonium in the mixture being controlled in accordance with the equation:

$$\Delta c_{Pu}/C_{Pu} = \alpha_8 \alpha f_{238} - \alpha_9 \alpha f_{239} + \alpha_0 \alpha f_{240} - \alpha_1 \alpha f_{241} = \alpha_2 \alpha f_{242} - [(1-C_{Pu})/C_{Pu}]\alpha_5 \alpha f_{235} + \alpha_{Am} \alpha f_{Am}$$

The left side of the above equation gives the relative change in total Pu content needed to compensate for deviations in the Pu, $U^{235}$ and $Am^{241}$ relative to the specified composition. $f_{238}$, $f_{239}$, $f_{240}$, $f_{241}$ and $f_{242}$ represent the absolute perturbations in the $Pu^{238}$, $Pu^{239}$, $Pu^{240}$, $Pu^{241}$ and $Pu^{242}$ isotopic fractions, respectively. $f_{235}$ is the absolute perturbation for $U^{235}$ and $f_{Am}$ that for $Am^{241}$ The $\alpha$'s, which are all positive in value, are related to the partial derivatives of lifetime averaged reactivity to variations in the individual isotopes. The $\alpha$'s vary from reactor to reactor depending on the fuel design and the fuel management scheme. For pressurized water reactors, the coefficients have values in the region of $\alpha_8 \approx 1.5$, $\alpha_9 \approx 2.0$, $\alpha_0 \approx 1.0$, $\alpha_1 \approx 2.0$, $\alpha_2 \approx 3.0$, $[(1-C_{Pu})/C_{Pu}]\alpha_5 \approx 30.0$ and $\alpha_{Am} \approx 3.0$. The signs of the terms in the equation thus reflect whether the associated isotope contributes to fissions or is an absorber. The large numerical value for the $U^{235}$ coefficient merely reflects the fact that the bulk of the MOX fuel consists of $UO_2$, and a given change in the concentration of $U^{235}$ corresponds to a large absolute change in the concentration of $U^{235}$ atoms. The plutonium-containing solution may comprise $Pu(NO_3)_4$, or some other solution such as a sulphate.

It is an advantage of the invention that variations in plutonium isotopic composition can be compensated for within a fuel reload quantity by varying the weight of plutonium, thus obviating the need for a complex and costly homogenisation stage. Thus use of the invention should ensure that the reactivity of a particular MOX fuel assembly averaged over its lifetime from initial insertion in a reactor to final discharge from the reactor substantially matches that of a specified nuclear fuel assembly which might be a uranium dioxide fuel assembly co-resident in the reactor or another MOX fuel assembly. Hence, the particular MOX fuel assembly should contribute its full share to the reactivity of the reactor.

The plutonium oxide may be precipitated, mixed with the uranium oxide (eg $UO_2$), and formed into fuel pellets (eg cylindrical pellets) by methods known in the art. It will be understood that as used herein the term "uranium oxide" includes appropriate oxides such as uranium dioxide.

We claim:

1. A process for the production of plutonium-containing mixed oxide nuclear fuel, the process comprising selecting a plutonium-containing solution, determining the plutonium isotopic composition of the solution, precipitating particulate plutonium oxide from the solution, forming a mixture comprising the plutonium oxide and a particulate uranium oxide, and forming nuclear fuel compacts from the mixture, the amount of plutonium in the mixture being controlled in accordance with the equation:

$$\Delta C_{Pu}/C_{Pu} = \alpha_8 \alpha f_{238} - \alpha_9 \alpha f_{239} + \alpha_0 \Delta f_{240} - \alpha_1 \Delta f_{241} + \alpha_2 \Delta f_{242} - [(1-C_{Pu})/c_{Pu}] \alpha_5 \Delta f_{235} + \alpha_{Am} \Delta f_{Am}$$

$f_{238}$, $f_{239}$, $f_{240}$, $f_{241}$ and $f_{242}$ representing the absolute perturbations in the $Pu^{238}$, $Pu^{239}$, $Pu^{240}$, $Pu^{241}$ and $Pu^{242}$ isotopic fractions, respectively, $f_{235}$ being the absolute perturbation for $U^{235}$, and $f_{Am}$ that for $Am^{241}$, the $\alpha$'s, all being positive in value and being factors related to the partial derivatives of lifetime averaged reactivity to variations in the individual isotopes.

2. A process as claimed in claim 1, wherein for said nuclear fuel for a pressurized water reactor, $\alpha_8 \approx 1.5$, $\alpha_9 \approx 2.0 \alpha_0 \approx 1.0$, $\alpha_1 \approx 2.0$, $\alpha_2 \approx 3.0$,
$[(1-C_{Pu})/C_{Pu}]\alpha_5 \approx 30.0$ and $\alpha_{Am} \approx 3.0$ 3. A process as claimed in claim 1 and wherein the uranium oxide comprises uranium dioxide.

4. A process as claimed in claim 1 and wherein the compacts comprise cylindrical pellets.

* * * * *